(12) United States Patent
Fleury

(10) Patent No.: US 11,305,624 B2
(45) Date of Patent: Apr. 19, 2022

(54) MULTI POSITION FOLDING PANEL TRUCK BOX COVER ASSEMBLY

(71) Applicant: Denis Fleury, Hamilton (CA)

(72) Inventor: Denis Fleury, Hamilton (CA)

( * ) Notice: Subject to any disclaimer, the term of this patent is extended or adjusted under 35 U.S.C. 154(b) by 0 days.

(21) Appl. No.: 16/939,434

(22) Filed: Jul. 27, 2020

(65) Prior Publication Data

US 2021/0031604 A1    Feb. 4, 2021

Related U.S. Application Data

(60) Provisional application No. 62/880,759, filed on Jul. 31, 2019.

(51) Int. Cl.
*B60J 7/14* (2006.01)
*B60J 7/19* (2006.01)

(52) U.S. Cl.
CPC .............. *B60J 7/141* (2013.01); *B60J 7/196* (2013.01); *B60J 7/198* (2013.01)

(58) Field of Classification Search
CPC .. B60J 7/141; B60J 7/198; B60J 7/196; B60P 3/34
USPC ....................................................... 296/26.06
See application file for complete search history.

(56) References Cited

U.S. PATENT DOCUMENTS

| | | | | |
|---|---|---|---|---|
| 3,768,858 A * | 10/1973 | Boismier | ................. | B60J 7/141 296/100.09 |
| 5,110,021 A * | 5/1992 | Dawson, Jr. | ............ | B60J 7/141 224/405 |
| 6,428,079 B1 * | 8/2002 | Van Dyke | ................ | B60J 7/141 296/100.01 |
| 6,435,594 B1 * | 8/2002 | Ekonen | ..................... | B60J 7/041 296/100.09 |
| 8,678,459 B1 * | 3/2014 | Win | ......................... | B60P 3/40 296/3 |
| 10,435,082 B1 * | 10/2019 | Kupina | ................ | B62D 33/033 |
| 2002/0149219 A1 * | 10/2002 | Rios | ........................ | B60J 7/141 296/26.06 |
| 2004/0160083 A1 * | 8/2004 | Marx | ....................... | B60J 7/041 296/100.09 |
| 2008/0129067 A1 * | 6/2008 | Rios | ........................ | B60P 3/40 296/3 |
| 2015/0291017 A1 * | 10/2015 | LaBiche | ................ | B60J 7/1204 296/100.09 |
| 2017/0361691 A1 * | 12/2017 | Fuller | ...................... | B60J 7/141 |
| 2019/0168590 A1 * | 6/2019 | O'Reilly | .................. | B60J 7/141 |
| 2020/0139873 A1 * | 5/2020 | McGregor | .......... | E04B 1/34352 |
| 2020/0376943 A1 * | 12/2020 | Fisher | ................... | B60J 7/1204 |

* cited by examiner

*Primary Examiner* — Jason S Morrow

(57) ABSTRACT

The present concept is a multi position folding panel truck box cover assembly which includes a left and a right longitudinally extending foldable cover sections, wherein each cover section includes an outside face an inside face and an outer edge and an inner edge. The left and right cover sections are pivotally connected, to a left sidewall and a right sidewall respectively of a truck box. The left and right cover sections each further include two longitudinal panels namely a left and right inner panel and a left and right outer panel, wherein the left panels are pivotally coupled at the inside face proximate a middle edge and make up the left cover section, and wherein the right panels are pivotally coupled at the inside face proximate a middle edge and make up the right cover section.

9 Claims, 9 Drawing Sheets

MULTI POSITION FOLDING PANEL TRUCK BOX COVER ASSEMBLY

This application claims priority from a U.S. provisional application No. 62/880,759 filed on Jul. 31, 2019 under the title: Multi Position Folding Panel Truck Box Cover Assembly by Denis Fleury.

FIELD OF THE INVENTION

This invention relates to pickup truck box covers and in particular relates to a Multi Position Folding Panel Truck Box Cover Assembly.

BACKGROUND OF THE INVENTION

There are numerous types of pickup truck box cover assemblies that are available for purchase on the open market.

Some of these are called tonneau covers which may be soft and/or hard covers which extend across the open portion of the truck box and can be opened either by rolling up a soft cover or by hingably opening or pivoting open a hard cover.

There are also other types of covers generally known as truck caps which typically is a cover at the same height as the truck cab and is particularly useful when hauling large material. In some designs the cap is actually higher than the truck cab.

There are yet other accessories that one can buy for truck boxes namely side extenders which are used to increase the carrying volume or carrying capacity of the truck box by using vertically extending sides that connect with the side walls of the existing truck box cover and are usually permanently or semi permanently put in place on the truck box.

Despite the large number of truck box covers that are available each of them seems to have a function which is specifically designed to carry out a certain task. It would be advantageous to have a cover which would be able to carry out multiple tasks by being able to position the truck box cover into multiple positions. In this regard there have been some prior art concepts which are described in for example US Patent Application 2006/0119124 entitled 'Convertible Cap/Cover Assembly For A Pickup Truck' filed by inventor Cedric Herbert Briggs which describes a convertible truck box cover which can be converted from a first position which is a more or less flat cover extending across the side walls of the truck box, and the second position which is a cap configuration where the sides are generally upright and allows for greater load baring capacity due to the increased volume of the combination of the existing truck box and the convertible cover Another truck box cover is described in U.S. Pat. No. 9,713,950 titled 'Convertible Side Wall Extender To Truck Bed Cover Assembly' filed by the inventor David Stoddard Jr. and was issued on Jul. 25, 2017 describes a truck bed cover assembly which can be converted from a flat position which is typical of existing tonneau type covers, and an upright position which extends the side walls of the existing truck box which increases the carrying capacity of the truck box by extending vertically each of the side walls. The present concept is a Multi Position Folding Panel Truck Box Cover Assembly which includes at least four longitudinally extending panels along the truck box opening of a truck box and are hinge-ably connected such that the truck box cover can be manipulated into at least four different configurations to allow for multipurpose and uses and to be able to increase and decrease the volume of the cargo carrying capacity of the truck box.

SUMMARY OF THE INVENTION

A multi position folding panel truck box cover assembly includes;
a) a left and a right longitudinally extending foldable cover sections, each cover section including an outside face an inside face and an outer edge and an inner edge, wherein at the intersection of each of the right and left outer edges and the outside face the left and right cover sections are pivotally connected with a left outer hinge and a right outer hinge to a left sidewall and a right sidewall respectively of a truck box;
b) the left and right cover sections each further include two longitudinal panels namely a left and right inner panel and a left and right outer panel, wherein the left panels are pivotally coupled at the inside face proximate a middle edge and make up the left cover section, and wherein the right panels are pivotally coupled at the inside face proximate a middle edge and make up the right cover section, wherein the cover assembly configurations include;
i) a first covered configuration wherein the two cover sections each comprised of two panels are all disposed in a substantially horizontal coplanar edge to edge relation such that the left and right inner edges of the cover sections abut each other thereby covering the truck box.

Preferably the multi position folding panel truck box cover assembly wherein the cover assembly configurations includes;
ii) a second tall open configuration wherein the right cover section is in a generally vertically upright right cover position, and the left cover section is in a generally vertically upright left cover position each cover section extending upwardly from each respective sidewall wherein the inner and outer panels of each cover section are coplanar, such that in the second tall open configuration the left inner and left outer panels form a left vertical sidewall extension, and the right inner and right outer panels form a right vertical sidewall extension, thereby increasing the effective height of the truck box.

Preferably the multi position folding panel truck box cover assembly includes a transversely telescopically extending forward pintle bar in the second tall open configuration, extending between the left and right cover sections, the forward pintle bar includes left and right pintles which cooperatively engage with left and right gudgeons on each inner edge of each left and right inner panel respectively for receiving the pintles therein.

Preferably the multi position folding panel truck box cover assembly includes a transversely telescopically extending rear pintle bar in the second tall open configuration, extending between the left and right cover sections, the rear pintle bar includes left and right pintles which cooperatively engage with left and right gudgeons on each inner edge of each left and right inner panel respectively for receiving the pintles therein.

Preferably the multi position folding panel truck box cover assembly includes;
v) a third open wide configuration wherein each outer panel is pivoted to a fully open position thereby extending horizontally away from each sidewall, and each inner panel is pivoted to extend perpendicular and generally vertically upright from each of the outer panels thereby forming an upper opening wider than a truck box opening.

Preferably the multi position folding panel truck box cover assembly includes a transversely telescopically extending pintle bar extending between the left and right inner panels, the pintle bar includes left and right pintles which cooperatively engage with left and right gudgeons on each inner edge of each left and right inner panel respectively for receiving the pintles therein.

Preferably the multi position folding panel truck box cover assembly includes;
vi) A fourth low open configuration wherein each outer panel is pivoted to a generally upwardly vertical position and each inner panel is pivoted to a generally vertically downwardly position such that the inside faces of the left inner and outer panels abut and the inside faces of the right inner and outer panels abut, wherein the left inner and outer panels form a low double paneled vertical sidewall extension, wherein the right inner and outer panels form a low double paneled vertical sidewall extension.

Preferably the multi position folding panel truck box cover assembly includes a transversely extending pintle bar, extending between the left and right inner panels, the pintle bar with left and right pintles which cooperatively engage with left and right gudgeons in each inner panel, having openings for receiving the pintles onto the middle edge of each left and right inner panel respectively.

Preferably the multi position folding panel truck box cover assembly includes a left T-bar and a right T-bar both longitudinally extending which are fastened to the left and right side walls respectively, wherein the left outer hinge and right outer hinge are fastened to the left T-bar and to the right T-bar respectively.

Preferably the multi position folding panel truck box cover assembly includes a planar cab gate pivotally connected to a cab wall of the truck box and moveable between a rest position wherein the gate lies horizontally just below and adjacent the multi position folding panel truck box cover in the first covered position, and an upright position wherein the cab gate extends vertically upright to approximately to the same height as each of the left and right vertical sidewall extensions.

Preferably the multi position folding panel truck box cover assembly includes a planar cab gate pivotally connected to a cab wall of the truck box and moveable between a rest position wherein the gate lies horizontally just below and adjacent the multi position folding panel truck box cover in the first covered position, and an upright position wherein the cab gate extends vertically upright to approximately to the same height as each of the left and right vertical sidewall extensions and wherein a gate upper rail cooperatively engages with the forward pintle bar thereby fixing the position of the cab gate in the upright position.

BRIEF DESCRIPTION OF THE DRAWINGS

With the intention of providing demonstration of characteristics of the device or method, an example or examples are given below without restrictive character whatsoever with reverence to the corresponding figures of preferred embodiments of the device and method as follows:

FIG. 2a is a schematic magnified partial section of the Multi Position Folding Panel Truck Box Cover Assembly shown in FIGS. 1 and 2 enlarging the details of the hinged outer panel and inner panel connection and also the connection to the side walls of the truck box.

DETAILED DESCRIPTION OF THE PREFERRED EMBODIMENTS

Figure 1:
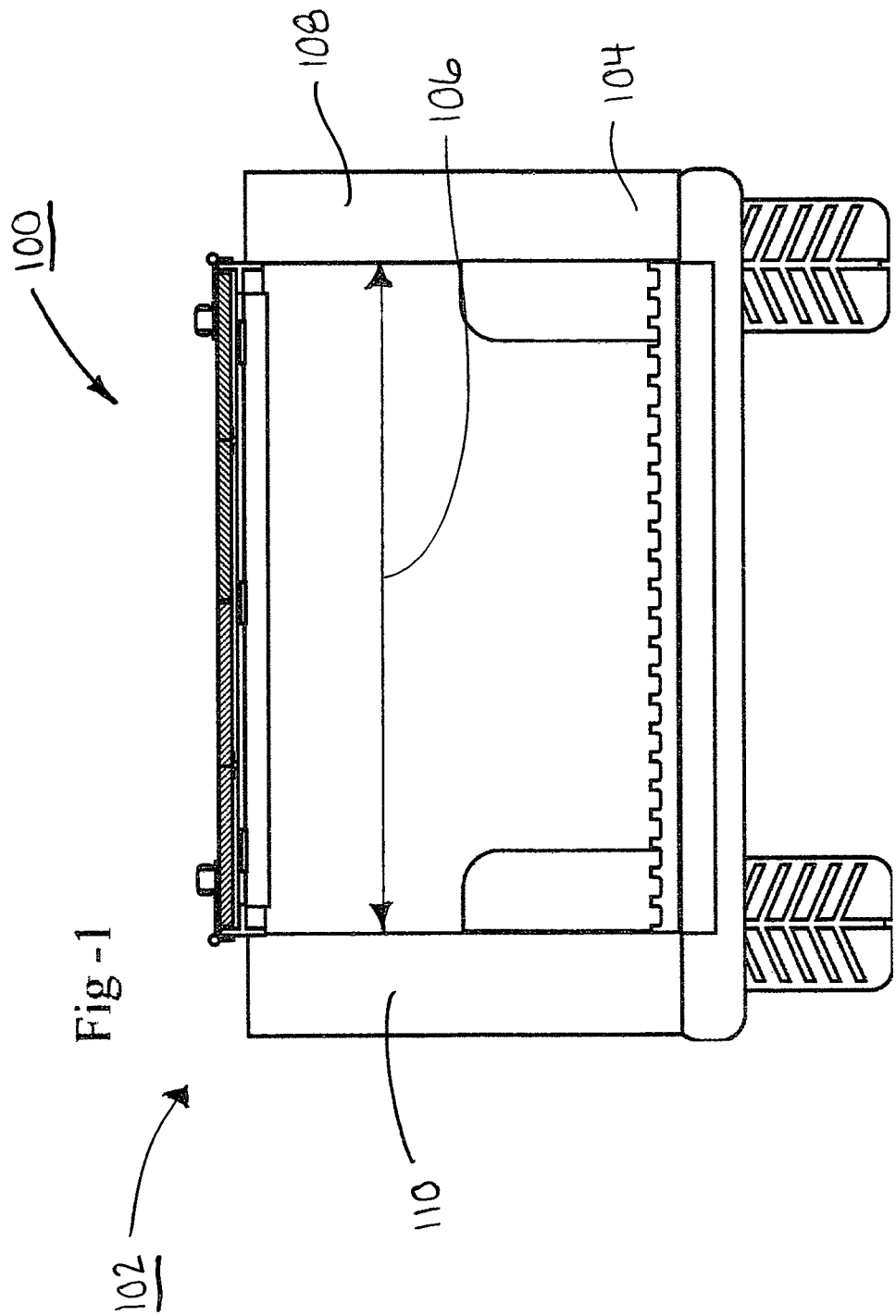
FIG. 1 is a schematic rear plan view of the Multi Position Folding Panel Truck Box Cover Assembly deployed onto the truck box of a pickup truck with the cover shown in a first covered configuration.

The present concept is a Multi Position Folding Panel Truck Box Cover Assembly shown generally as 100 and is shown deployed with truck box 104 which includes a truck box opening 106, a right wide wall 108, and a left side wall 110. The Multi Position Folding Panel Truck Box Cover Assembly of 100 is shown in a first covered position 102 as it is also shown in FIGS. 2 and 2a.

Figure 2:
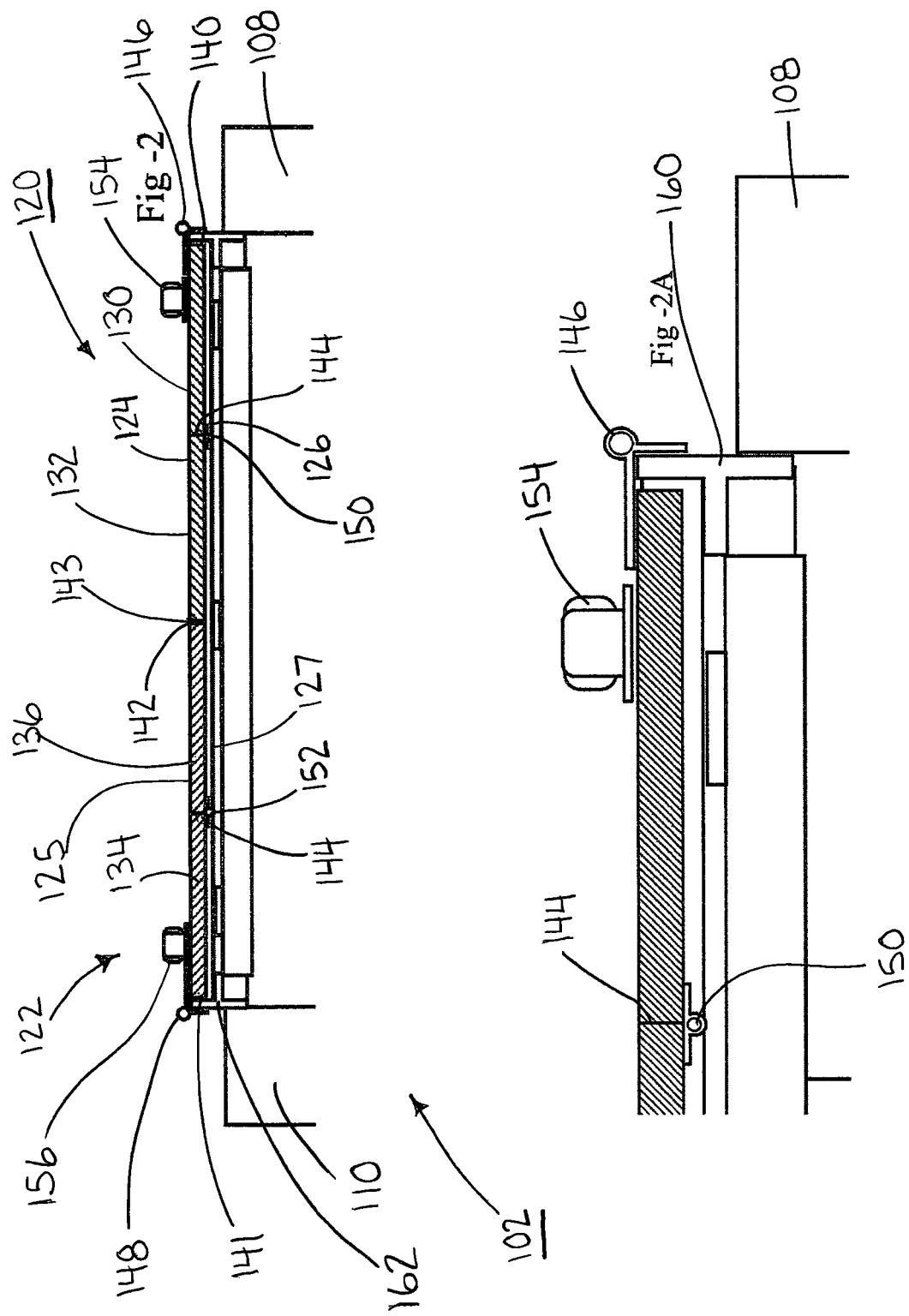
FIG. 2 is a partial magnified view of Multi Position Folding Panel Truck Box Cover Assembly deployed, onto a typical truck box with the cover shown in a first covered configuration.

Referring now to FIGS. 2 and 2a which similarly to FIG. 1 shows the Multi Position Folding Panel Truck Box Cover Assembly deployed onto a truck box 104 which includes the following major components namely right cover section 120, left cover section 122. Right cover section 120 includes right outer panel 130 and right inner panel 132 hingably connected by right panel hinges 150. Left cover section 122 includes left outer panel 134 and a left inner panel 136 hingably connected with left panel hinges 152.

Right cover section 120 includes outside face 124 and inside face 126 whereas left cover section 122 includes outside face 125 and inside face 127. Right cover section 120 is attached to a right T bar 160 at right outer edge 140 with a right outer hinge 146. Left cover section 122 is connected to left T bar 162 at a left outer edge 141 with a left outer hinge 148. Right outer hinge 146 is rigidly connected to right side wall 108 and left T bar 162 is rigidly connected to left side wall 110. Outer hinges 146 and 148 may each be one long style hinge or may be multiple discreet hinges spaced along the outer edges 140, 141 as shown in the diagrams.

Figure 4:
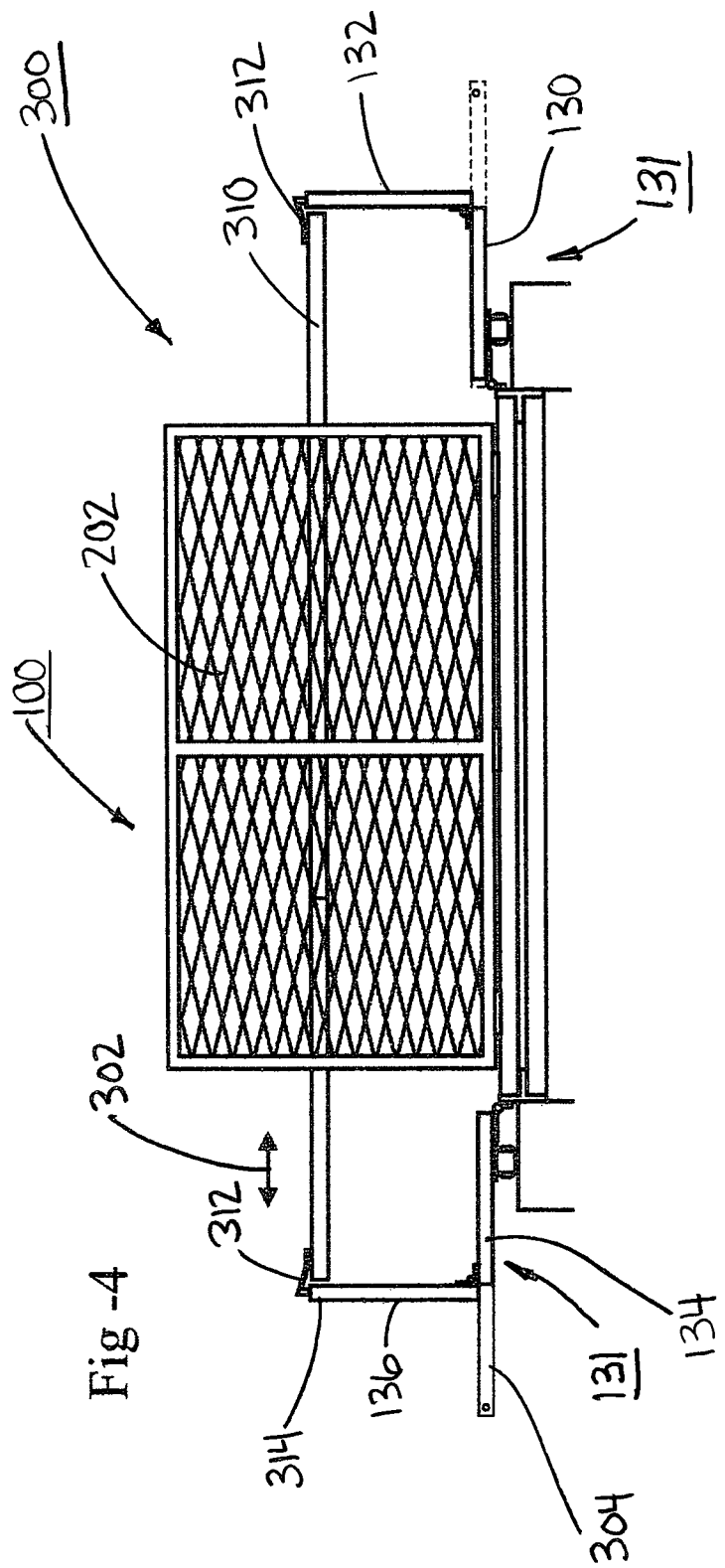
FIG. 4 illustrates in schematic fashion the Multi Position Folding Panel Truck Box Cover Assembly in a third open wide configuration with the right outer panel extending horizontally outwardly and the right inner panel extending vertically upwardly and in similar fashion the left outer panel and left inner panels to provide for a wide configuration having an opening which is greater than the truck box opening.

Outer panels define a middle edge 144 and a right inner edge 143 and a left inner edge 142. Right outer panel also includes right side wall bumper 154 for butting against right side wall 108 of truck box 104 when in the third open wide configuration as shown in FIG. 4. The left and right outer panels 134, 130 are depicted in a fully open position 131 in FIG. 4.

Similarly left outer panel 134 also includes left side wall bumper 156 which is used for butting the left side wall 110 of truck box 104 when in the third open wide configuration as shown in FIG. 4.

Figure 3:
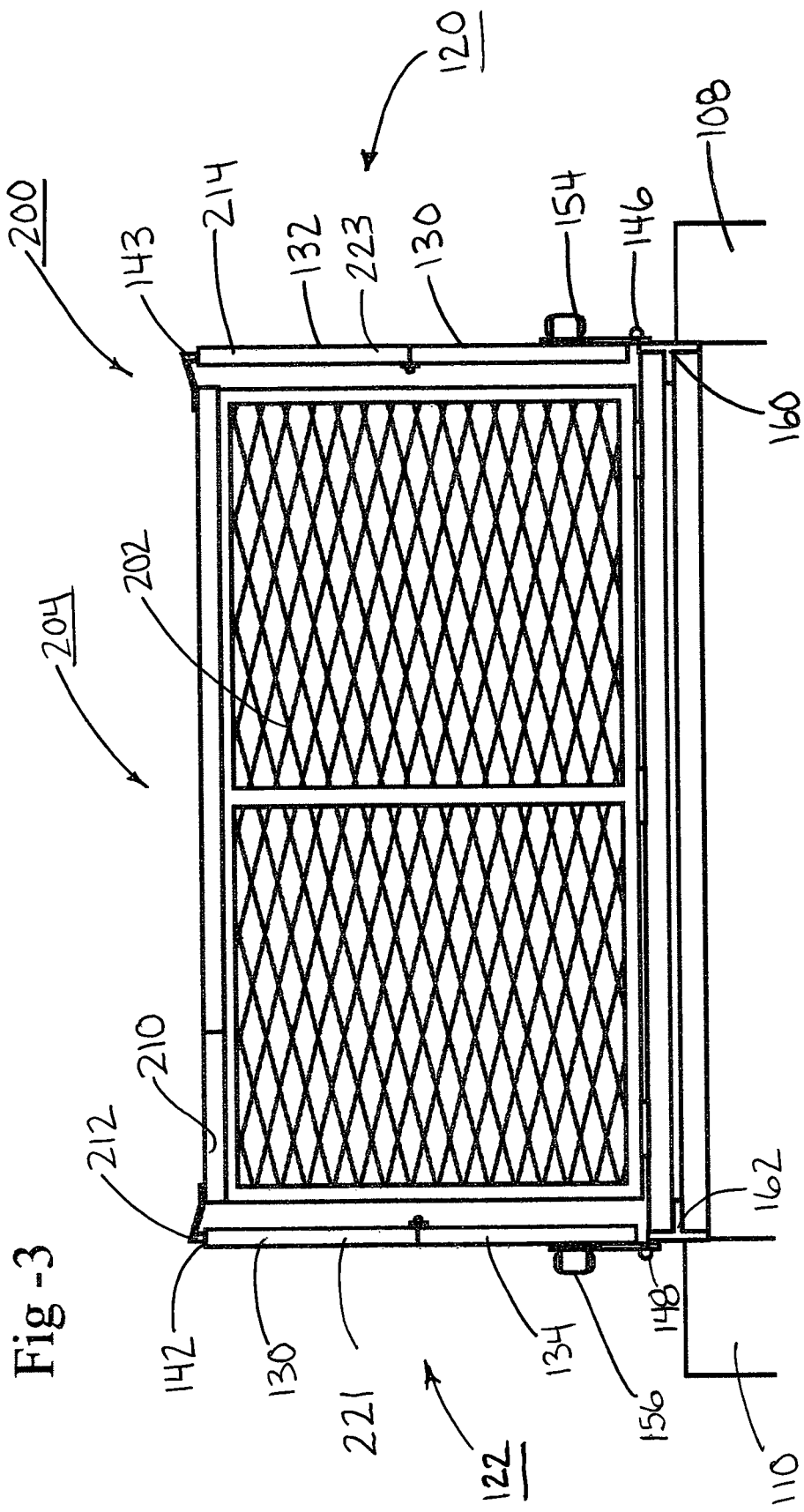
FIG. 3 is a schematic rear plan view of the Multi Position Folding Panel Truck Box Cover Assembly shown in a second tall open configuration also showing a cab gate in an upright position.

Now referring to FIG. 3 the Multi Position Folding Panel Truck Box Cover Assembly shown generally as 100 is depicted in a second tall open configuration 200 which may include a cab gate 202 shown in an upright position 204 wherein the right cover section 120 which is comprised of a right outer panel 130 and a right inner panel 132 are shown in a generally upright vertical side by side configuration and whereas left cover section 122 which is comprised of left outer panel 134 and left inner panel 136 is also shown generally in an upstanding vertical side by side configuration. The right cover vertical section and the left cover vertically oriented section is referred to as a left vertical sidewall extension 221 and a right vertical sidewall extension 223.

There further includes a forward pintle bar 210 which includes pintle 212 at each distal end which cooperates with a gudgeon 214 for receiving the pintle 212 there in for holding into position the right cover section 120 and the left cover section 122 in the upstanding position as shown in FIG. 3. The reader will note that right cover section 120 can pivot about right outer hinge 146 and left cover section 122 can pivot about left outer hinge 148.

The cab gate 202 includes a gate upper rail 203 which in an upright position 204 cooperatively engages with forward pintle bar 210 to fix the position of the cab gate 202. The engagement may be a simple groove along the underside of the forward pintle bar 210 or the forward pintle bar 210 may be telescopically extendable and integrally part of the gate upper rail 203.

Referring now to FIG. 4 Multi Position Folding Panel Truck Box Cover Assembly shown generally as 100 is shown in the third open wide configuration 300 where in the right outer panel 130 and left outer panel 134 are pivoted into a horizontal position as shown in FIG. 4 and extend outwardly from each of the right side wall 108 and left side wall 110 of truck box 104 respectively. Right inner panel 132 and left inner panel 136 are hingably connected to right outer panel 130 and left outer panel 134 with right panel hinge 150 and left panel hinge 152 respectively and positioned perpendicular to right outer panel 130 and to left outer panel 134 respectively.

This puts the Multi Position Folding Panel Truck Box Cover Assembly in the third open wide configuration 300 and a pintle bar 310 which has pintles 310 at each distal end there of which cooperate with gudgeons 314 which are defined in the right inner edge 134 of right inner panel 132 and the left inner edge 142 with left inner panel 136 and are used to maintain the third open wide configuration 300 as shown in FIG. 4.

The cab gate 202 is also shown in an upright position 204 as also in FIG. 3.

FIG. 4 also shows right side wall bumper 154 butting against the top of right side wall 108 and left side wall bumper 156 butting against left side wall 110 of truck box 104.

Figure 5:
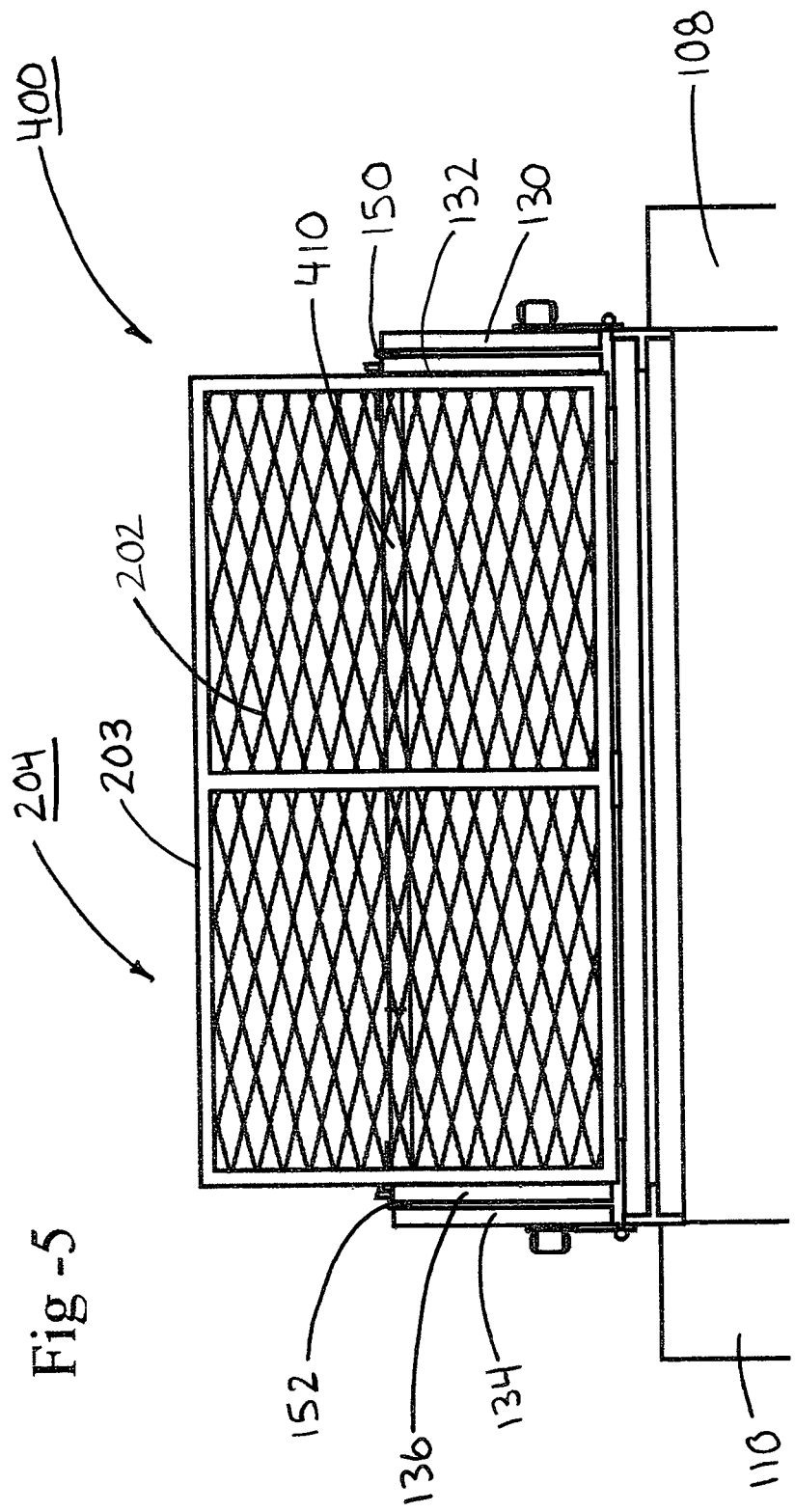
FIG. 5 is another rear plan view of the Multi Position Folding Panel Truck Box Cover Assembly deployed onto side walls of a truck box opening shown in a fourth low open configuration in which the outer panel and inner panels are pivoted or folded onto each other such that the inside faces are butting each other thereby providing a low open position as depicted together with the cab gate shown in an upright position.

Referring now to FIG. 5 which shows the Multi Position Folding Panel Truck Box Cover Assembly 100 in yet a fourth configuration namely fourth low open configuration 400 where in right outer panel 130 and right inner panel 132 are folded onto each other such that the inside face 126 of each panel is adjacent to each other and left outer panel 134 and left inner panel 136 are also folded onto each other such that the inside face 127 is adjacent to each other. The cab gate 202 is shown in the upright position 204 as in FIGS. 3 and 4, and a pintle bar 410 spans across the truck box opening 106 and connects right inner panel 132 with left inner panel 136.

The reader will note that pintle bars 410, 310, and 210 may be telescoping in nature which means that a single pintle bar can be used to accommodate a number of different widths as shown for example in FIGS. 3, 4, and 5.

Figure 6:
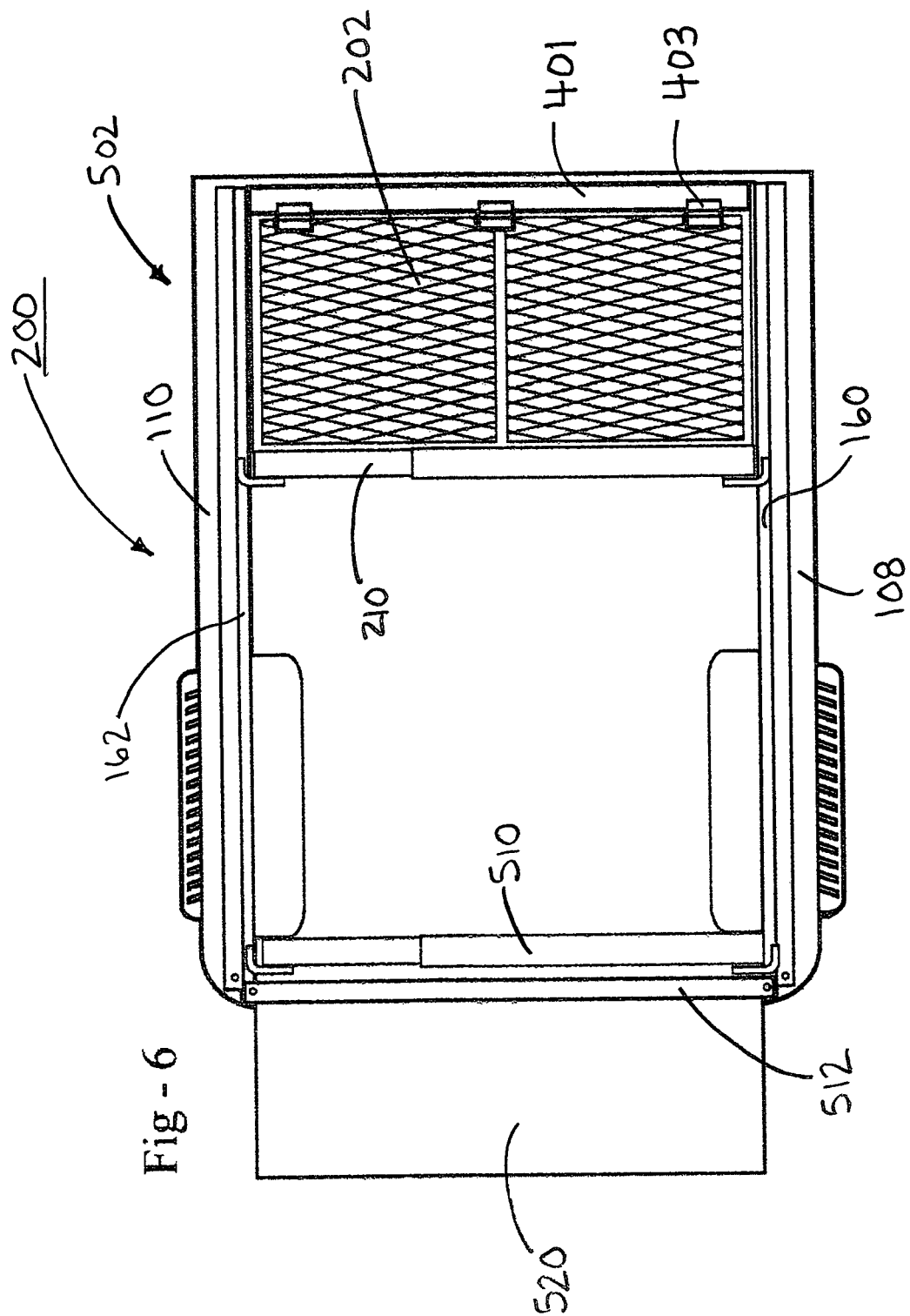
FIG. 6 is a schematic top plan view looking down from above onto a truck box opening with the right and left panels in the second tall open configuration as shown in FIG. 3 with the cab gate in the rest position and also a front pintle bar, a rear pintle bar, and a rear cross member.

Referring now to FIG. 6 which is a schematic top plan view looking down from above onto a truck box opening with the right and left panels in the second tall open position 200 as also shown in FIG. 3. Cab gate 202 in rest position 502 and is connected to cab wall 401 with gate hinges 403. Cab gate v202 includes a gate upper rail 203 which may be integrally connected to forward pintle bar 210. The pintles 212 may rest on right and left T-bars 160 and left T-bar 162 respectively.

Figure 7:
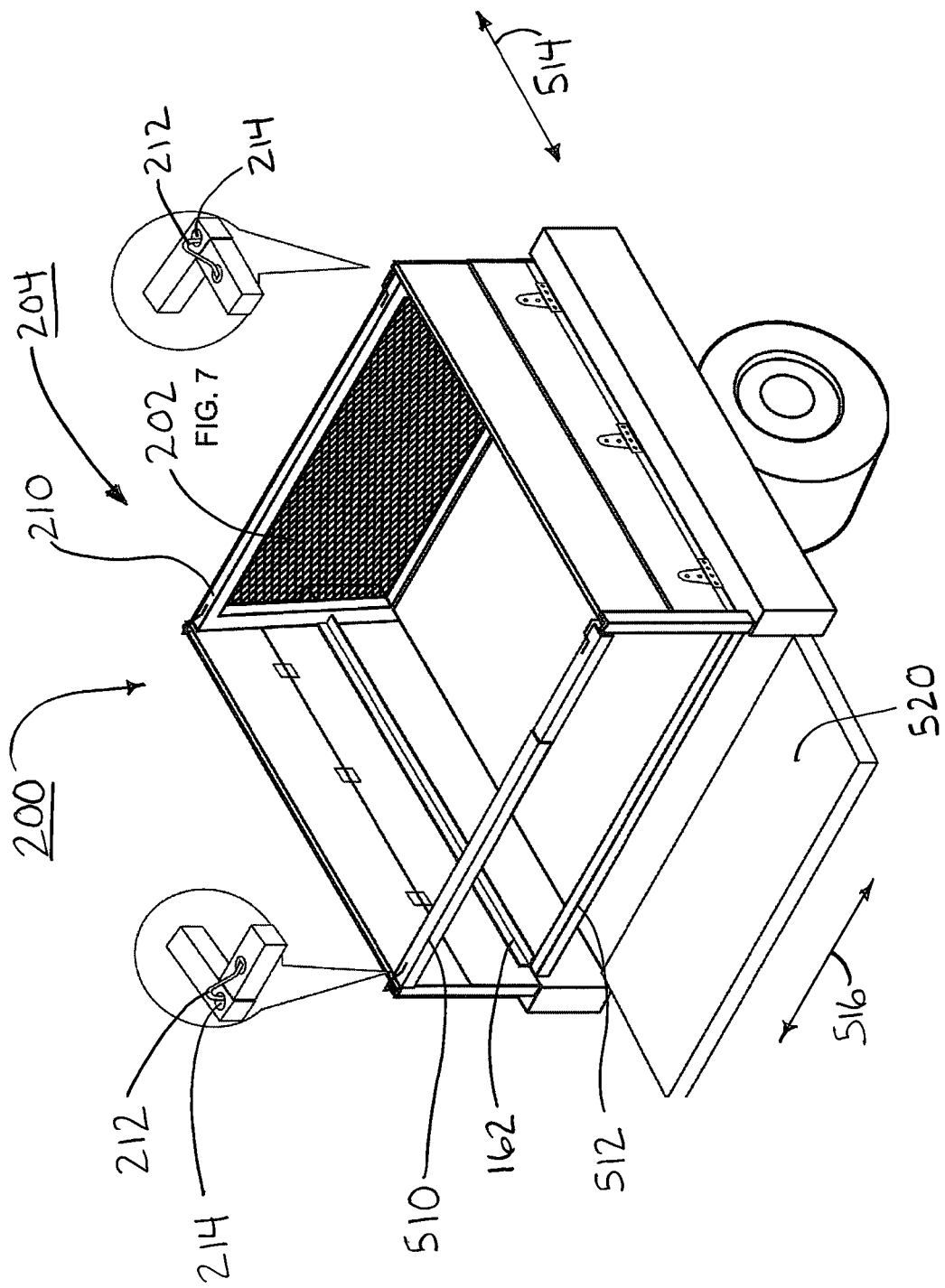
FIG. 7 is a schematic perspective view with partial magnifications of the Multi Position Folding Panel Truck Box Cover Assembly deployed onto a truck box where in the cover is shown in the second tall open configuration as in FIG. 3.

Referring now to FIG. 7 which is a schematic perspective view with partial magnifications of the Multi Position Folding Panel Truck Box Cover Assembly deployed onto a truck box where in the cover is shown in a second tall open position 200 as also shown in FIG. 3 where in pintle bar 210 is a telescoping pintle bar which can be lengthened or shortened in accordance with the desired width and where in the pintle 212 is inserted into the gudgeon 214 on all four corners similarly for rear pintle bar 510. FIG. 7 also indicates the longitudinal direction 514 as well as the transverse direction 516, the tailgate of the truck box 520, and the position of the rear cross member 512. Cab gate 202 is shown in an upright position 204 and held in this position by pintle bar 210 fastened at each corner with pintle 212 and gudgeon 214.

Figure 8:
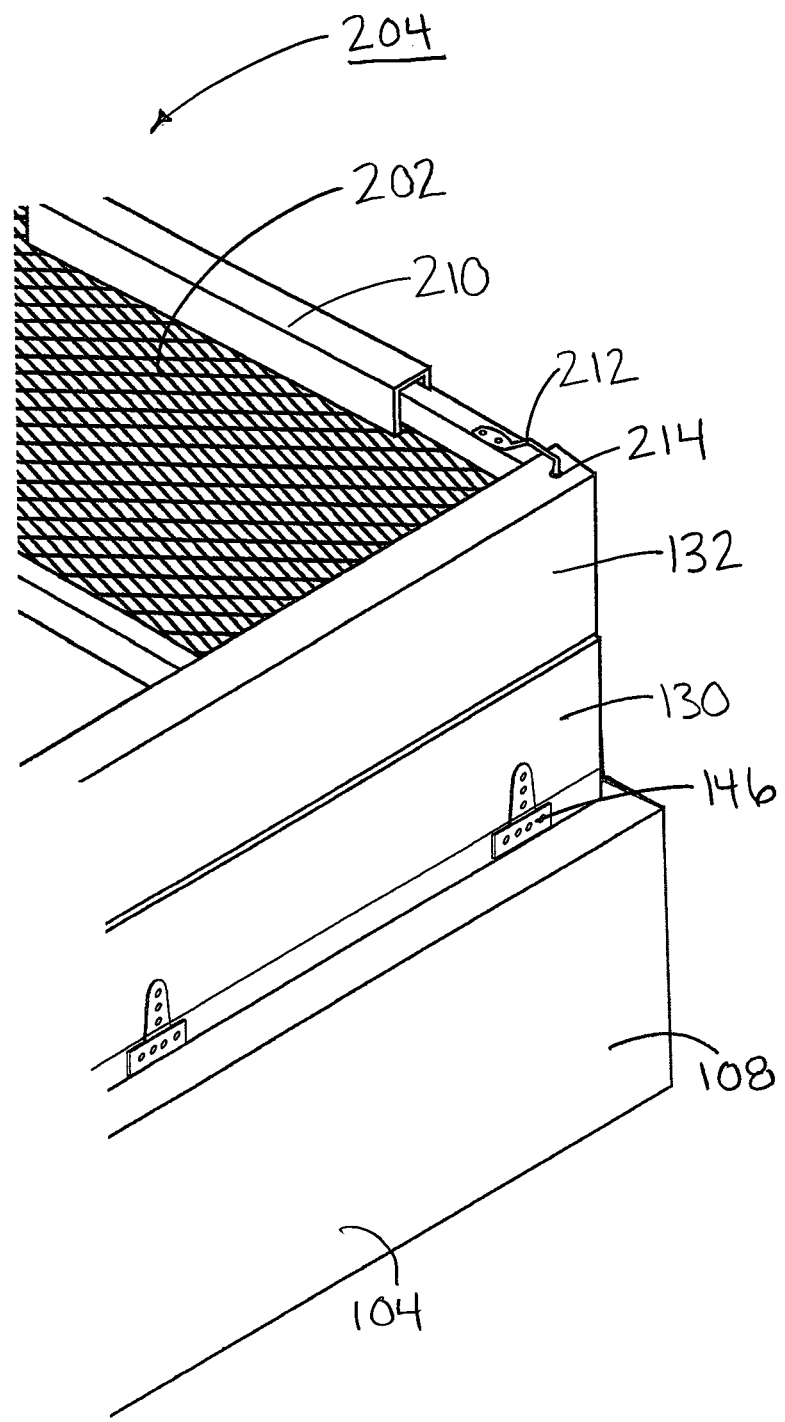
FIG. 8 is a schematic partial enlarged view of the right inner and outer panels in the second tall open configuration showing the pintle bar together with the pintle deployed into the gudgeon and the cab gate in the upright position.

FIG. 8 is a schematic partial enlarged view of the right inner and outer panels in the second tall open position showing pintle bar 210 and cab gate 202 together with pintle 212 inserted into gudgeon 214. FIG. 8 also shows the right inner panel 132, the right outer panel 130, and the right outer hinges 146 extending upwardly from right side wall 108 of truck box 104. Cab gate 202 is shown in an upright position 204 which the 'U' shaped pintle bar 210 engages with top edge 540 as shown in FIG. 4 of cab gate 202 thereby holding cab gate 202 in a stationary position. The reader will note that pintle bar 210 consists of two 'U' shape channels, one slidably received the other extending telescopically to accommodate different widths for example in the third wide open configuration shown in FIG. 4 pintle bar 310 is telescopically moved to a much wider position as shown in FIG. 4 then for example as shown in FIG. 5.

The reader will also note that pintle bar 310 and pintle bar 410 are shown in behind cab gate 202 when viewed from the rear position as in FIGS. 4 and 5 where as in FIGS. 3 and 7 pintle bar 210 engages with the top edge 540 of cab gate 202 thereby locking it into position.

When pintle bar 310 for example as shown in FIG. 4 or 410 as shown in FIG. 5 are in position in behind cab gate 202, other mechanisms such as a locking pin or a slide lock mechanism is used to hold pintle bar 310 and 410 to cab gate 202 thereby preventing the movement of cab gate 202.

Figure 9:
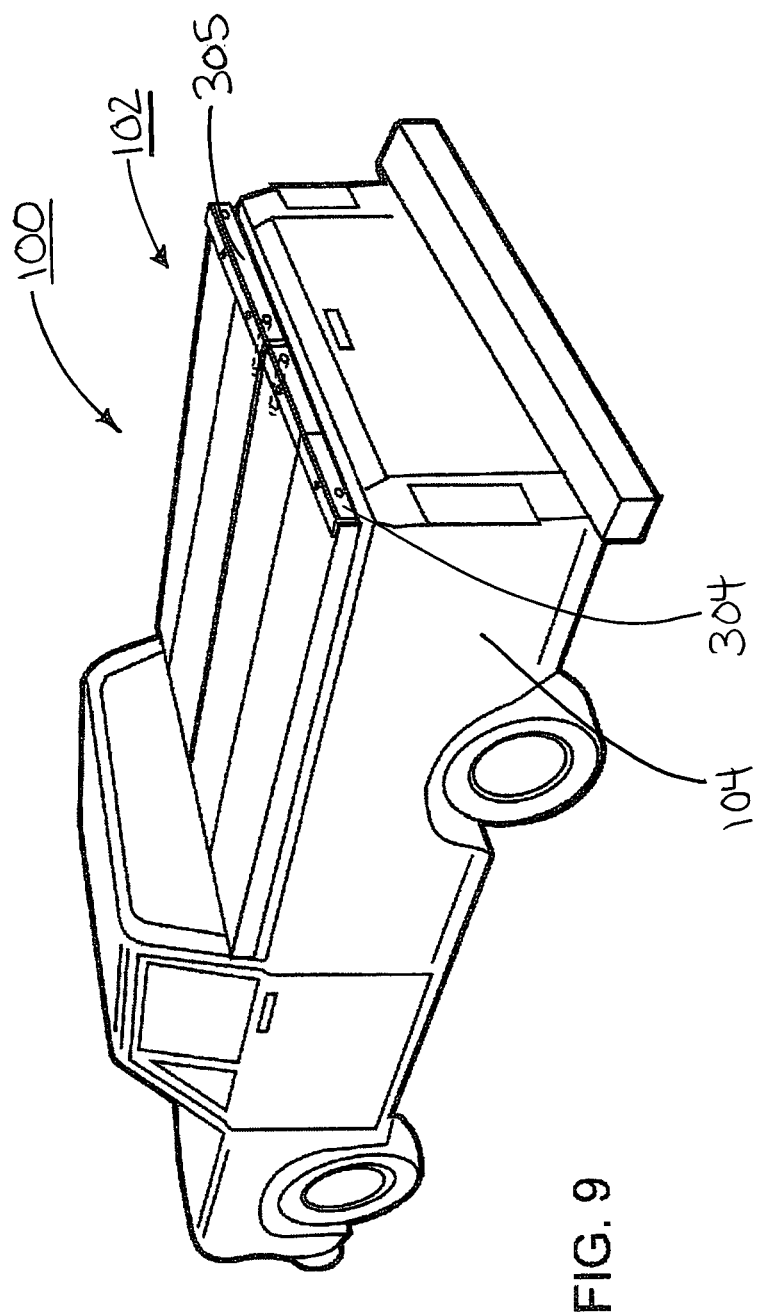
FIG. 9 is a rear schematic perspective view of the Multi Position Folding Panel Truck Box Cover Assembly deployed onto a pickup truck box shown together with the complete pickup truck and the Multi Position Folding Panel Truck Box Cover Assembly in the first covered configuration.

FIG. 9 is a schematic rear perspective view of the Multi Position Folding Panel Truck Box Cover Assembly shown generally as 100 deployed onto a pickup truck box 104 shown together with the complete pickup truck and the Multi Position Folding Panel Truck Box Cover Assembly 100 in a first covered configuration 102 together with support bar 304 and support bar 305.

The reader will also note that the present concept Multi Position Folding Panel Truck Box Cover Assembly can be moved from a first cover position 102 as shown in FIG. 1 as well as FIGS. 2, 2a, and 9 to a second tall open configuration 200 as shown in FIG. 3 to a third open wide configuration 300 as shown in FIG. 4 and to a fourth low open configuration 400 as shown in FIG. 5.

Right outer panel 130 and right inner panel 132 which make up right cover section 120 and left outer panel 134 and left inner panel 136 which make up left cover section 122 can easily be manipulated in order to produce the various configurations shown in the diagrams.

In this manner the Multi Position Folding Panel Truck Box Cover Assembly can be rearranged into a multitude of positions depending upon the user's selection.

The invention claimed is:

1. A multi position folding panel truck box cover assembly includes;
    a) a left and a right longitudinally extending foldable cover sections, each cover section including an outside face an inside face and an outer edge and an inner edge, wherein at the intersection of each of a right and a left outer edge and the outside face, the left and right cover sections are pivotally connected with a left outer hinge and a right outer hinge to a left sidewall and a right sidewall respectively of a truck box;
    b) the left and right cover sections each further include two longitudinal panels namely a left and right inner panel and a left and right outer panel, wherein the left panels are pivotally coupled at the inside face proximate a middle edge and make up the left cover section, and wherein the right panels are pivotally coupled at the inside face proximate a middle edge and make up the right cover section, wherein the cover assembly configurations include;
        i) a first covered configuration wherein the two cover sections each comprised of two panels are all disposed in a substantially horizontal coplanar edge to edge relation such that the left and right inner edges of the cover sections abut each other thereby covering the truck box,
        ii) a second tall open configuration wherein the right cover section is in a generally vertically upright right cover position, and the left cover section is in a generally vertically upright left cover position each cover section extending upwardly from each respective sidewall wherein the inner and outer panels of each cover section are coplanar, such that in the second tall open configuration the left inner and left outer panels form a left vertical sidewall extension, and the right inner and right outer panels form a right vertical sidewall extension, thereby increasing the effective height of the truck box, and
    c) further includes a transversely telescopically extending forward pintle bar in the second tall open configuration, extending between the left and right cover sections, the forward pintle bar includes left and right pintles which cooperatively engage with left and right gudgeons on each inner edge of each left and right inner panel respectively for receiving the pintles therein.

2. The multi position folding panel truck box cover assembly claimed in claim 1 further includes a transversely telescopically extending rear pintle bar in the second tall open configuration, extending between the left and right cover sections, the rear pintle bar includes left and right pintles which cooperatively engage with left and right gudgeons on each inner edge of each left and right inner panel respectively for receiving the pintles therein.

3. The multi position folding panel truck box cover assembly claimed in claim 1 further includes;
    iii) a open wide configuration wherein each outer panel is pivoted to a fully open position thereby extending horizontally away from each sidewall, and each inner panel is pivoted to extend perpendicular and generally vertically upright from each of the outer panels thereby forming an upper opening wider than a truck box opening.

4. A multi position folding panel truck box cover assembly includes;
    a) a left and a right longitudinally extending foldable cover sections, each cover section including an outside face an inside face and an outer edge and an inner edge, wherein at the intersection of each of a right and a left outer edge and the outside face, the left and right cover sections are pivotally connected with a left outer hinge and a right outer hinge to a left sidewall and a right sidewall respectively of a truck box;
    b) the left and right cover sections each further include two longitudinal panels namely a left and right inner panel and a left and right outer panel, wherein the left panels are pivotally coupled at the inside face proximate a middle edge and make up the left cover section, and wherein the right panels are pivotally coupled at the inside face proximate a middle edge and make up the right cover section, wherein the cover assembly configurations include;
        i) a first covered configuration wherein the two cover sections each comprised of two panels are all disposed in a substantially horizontal coplanar edge to edge relation such that the left and right inner edges of the cover sections abut each other thereby covering the truck box,
        ii) a open wide configuration wherein each outer panel is pivoted to a fully open position thereby extending horizontally away from each sidewall, and each inner panel is pivoted to extend perpendicular and generally vertically upright from each of the outer panels thereby forming an upper opening wider than a truck box opening,
    c) further includes a transversely telescopically extending pintle bar extending between the left and right inner panels, the pintle bar includes left and right pintles which cooperatively engage with left and right gudgeons on each inner edge of each left and right inner panel respectively for receiving the pintles therein.

5. The multi position folding panel truck box cover assembly claimed in claim 1 further includes;
   iii) a low open configuration wherein each outer panel is pivoted to a generally upwardly vertical position and each inner panel is pivoted to a generally vertically downwardly position such that the inside faces of the left inner and outer panels abut and the inside faces of the right inner and outer panels abut, wherein the left inner and outer panels form a low double paneled vertical sidewall extension, wherein the right inner and outer panels form a low double paneled vertical sidewall extension.

6. A multi position folding panel truck box cover assembly includes;
   a) a left and a right longitudinally extending foldable cover sections, each cover section including an outside face an inside face and an outer edge and an inner edge, wherein at the intersection of each of a right and a left outer edge and the outside face, the left and right cover sections are pivotally connected with a left outer hinge and a right outer hinge to a left sidewall and a right sidewall respectively of a truck box;
   b) the left and right cover sections each further include two longitudinal panels namely a left and right inner panel and a left and right outer panel, wherein the left panels are pivotally coupled at the inside face proximate a middle edge and make up the left cover section, and wherein the right panels are pivotally coupled at the inside face proximate a middle edge and make up the right cover section, wherein the cover assembly configurations include;
      i) a first covered configuration wherein the two cover sections each comprised of two panels are all disposed in a substantially horizontal coplanar edge to edge relation such that the left and right inner edges of the cover sections abut each other thereby covering the truck box,
      ii) a low open configuration wherein each outer panel is pivoted to a generally upwardly vertical position and each inner panel is pivoted to a generally vertically downwardly position such that the inside faces of the left inner and outer panels abut and the inside faces of the right inner and outer panels abut, wherein the left inner and outer panels form a low double paneled vertical sidewall extension, wherein the right inner and outer panels form a low double paneled vertical sidewall extension, and
   c) further includes a transversely extending pintle bar, positionable between the left and right inner panels, the pintle bar with left and right pintles which cooperatively engage with left and right gudgeons in each inner panel, having openings for receiving the pintles onto the middle edge of each left and right inner panel respectively.

7. The multi position folding panel truck box cover assembly claimed in claim 1 further include a left T-bar and a right T-bar both longitudinally extending which are fastened to the left and right side walls respectively, wherein the left outer hinge and right outer hinge are fastened to the left T-bar and to the right T-bar respectively.

8. The multi position folding panel truck box cover assembly claimed in claim 1 further includes a planar cab gate pivotally connected to a cab wall of the truck box and moveable between a rest position wherein the gate lies horizontally just below and adjacent the multi position folding panel truck box cover in the first covered position, and an upright position wherein the cab gate extends vertically upright to approximately to the same height as each of the left and right vertical sidewall extensions.

9. The multi position folding panel truck box cover assembly claimed in claim 1 further includes a planar cab gate pivotally connected to a cab wall of the truck box and moveable between a rest position wherein the gate lies horizontally just below and adjacent the multi position folding panel truck box cover in the first covered position, and an upright position wherein the cab gate extends vertically upright to approximately to the same height as each of the left and right vertical sidewall extensions and wherein a gate upper rail cooperatively engages with the forward pintle bar thereby fixing the position of the cab gate in the upright position.

\* \* \* \* \*